US006120628A

United States Patent [19]

Pritelli

[11] Patent Number: 6,120,628

[45] Date of Patent: Sep. 19, 2000

[54] SYSTEM FOR DEFINING AND MAKING WOODEN FURNITURE PANELS

[75] Inventor: Giuseppe Pritelli, Cattolica, Italy

[73] Assignee: SCM Group Autec Division, S.p.A., Rimini, Italy

[21] Appl. No.: 09/081,302

[22] Filed: May 19, 1998

[30] Foreign Application Priority Data

May 23, 1997 [IT] Italy ................................ BO97A0310

[51] Int. Cl.[7] ...................................................... B32B 31/18

[52] U.S. Cl. ............................ 156/64; 144/346; 144/351; 156/264; 156/265; 156/266; 156/304.1; 156/544

[58] Field of Search ..................................... 156/250, 258, 156/264, 266, 265, 544, 550, 64, 304.1, 304.5; 144/345, 346, 350, 351

[56] References Cited

U.S. PATENT DOCUMENTS 4,356,045 10/1982 Elford et al. ............................ 156/258

4,731,145 3/1988 Senzani .................................. 156/264

5,135,597 8/1992 Barker .................................... 156/264

*Primary Examiner*—Mathieu D. Vargot

*Attorney, Agent, or Firm*—Fay, Sharpe, Fagan, Minnich & McKee, LLP

[57] ABSTRACT

A system for defining and making wooden panels and similar items for furniture includes the following in sequence: a first station for loading an unworked piece of defined thickness ($S_h$) onto a second station for cutting the unworked piece lengthways into two or more strip elements of equal width ($LR_{hi}$); a third station for working the leading end and the trailing end of each strip element as it moves forward so that the strip elements can then be glued together end to end in sequence to form a continuous strip of strip elements and a fourth station where the continuous strip is cut crossways into a plurality of unworked panel strips whose length ($LU_{hij}$) is defined by a sum of multiples of the panels needed to make a unit required or programmed.

8 Claims, 5 Drawing Sheets

SYSTEM FOR DEFINING AND MAKING WOODEN FURNITURE PANELS

BACKGROUND OF THE INVENTION

The present invention relates to a system for defining and making prismatic wooden panels designed to be assembled to form furniture units.

At present, the sector relating to the production and sale, whether direct or indirect, of furniture consisting of assemblies of pluralities of wooden panels follows construction philosophies designed to permit a high output of panels of standard sizes and colours so as to provide purchasers with modular units that can be assembled in different configurations according to furnishing requirements.

This standardization arose principally to enable optimum use to be made of known panel making lines consisting of a series of high-output automatic machines (also called "transfer" machines by persons skilled in the trade) such as, for example, panel saws, sanders, edge banders and drilling machines.

The need to standardize production, however, presents a number of disadvantages. One disadvantage is the high warehouse costs which the manufacturer must sustain in order to have a ready supply of panels to be able to offer customers a full range of construction solutions and colours at all times. Another disadvantage is the difficulty of dealing promptly with requests for customized furniture designs and colours at costs comparable to the cost of standard production.

SUMMARY OF THE INVENTION

To overcome these disadvantages, the Applicant has designed and created a system that is capable of making wooden furniture panels in response to market demands or in accordance with the requirements of the orders in progress at any given point in time and which can even be programmed in real time. In terms of production times and costs, the operations are the same whether the panels concerned are standard or customized and, moreover, the automatic machines that carry out the different steps in the process can be kept at optimum output levels.

BRIEF DESCRIPTION OF THE DRAWINGS

The technical characteristics of the present invention, according to the above mentioned aims are described in the claims below and its advantages are apparent from the detailed description which follows, with reference to the accompanying drawings which illustrate preferred embodiments of the invention, and in which:

DESCRIPTION OF THE PREFERRED EMBODIMENTS

Figure 1:
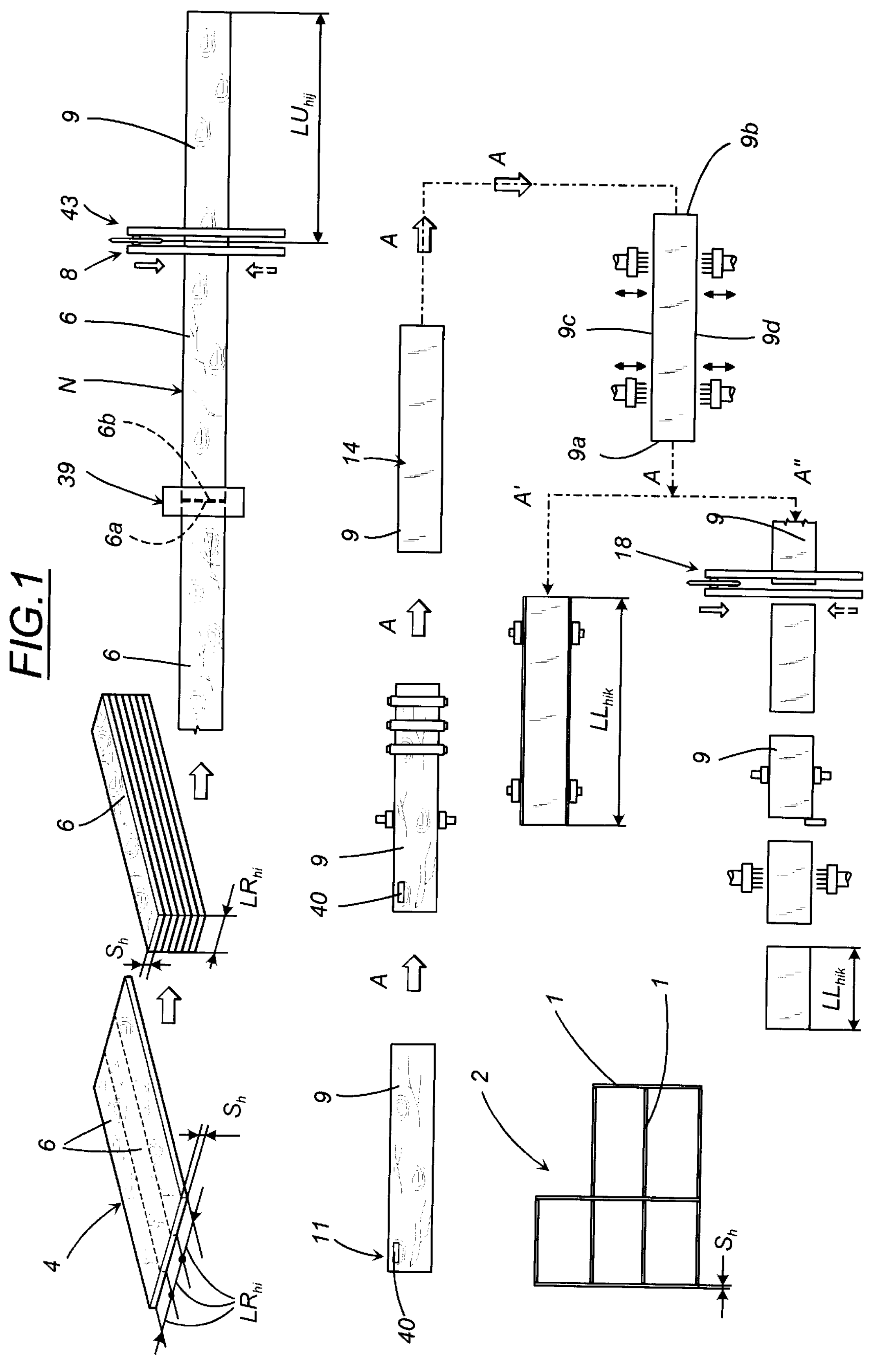
FIG. 1 illustrates a succession of steps in the manufacture of a wooden panel by the system disclosed by the present invention, all the steps being shown in plan view except the last, which is a front view.
Figure 2:
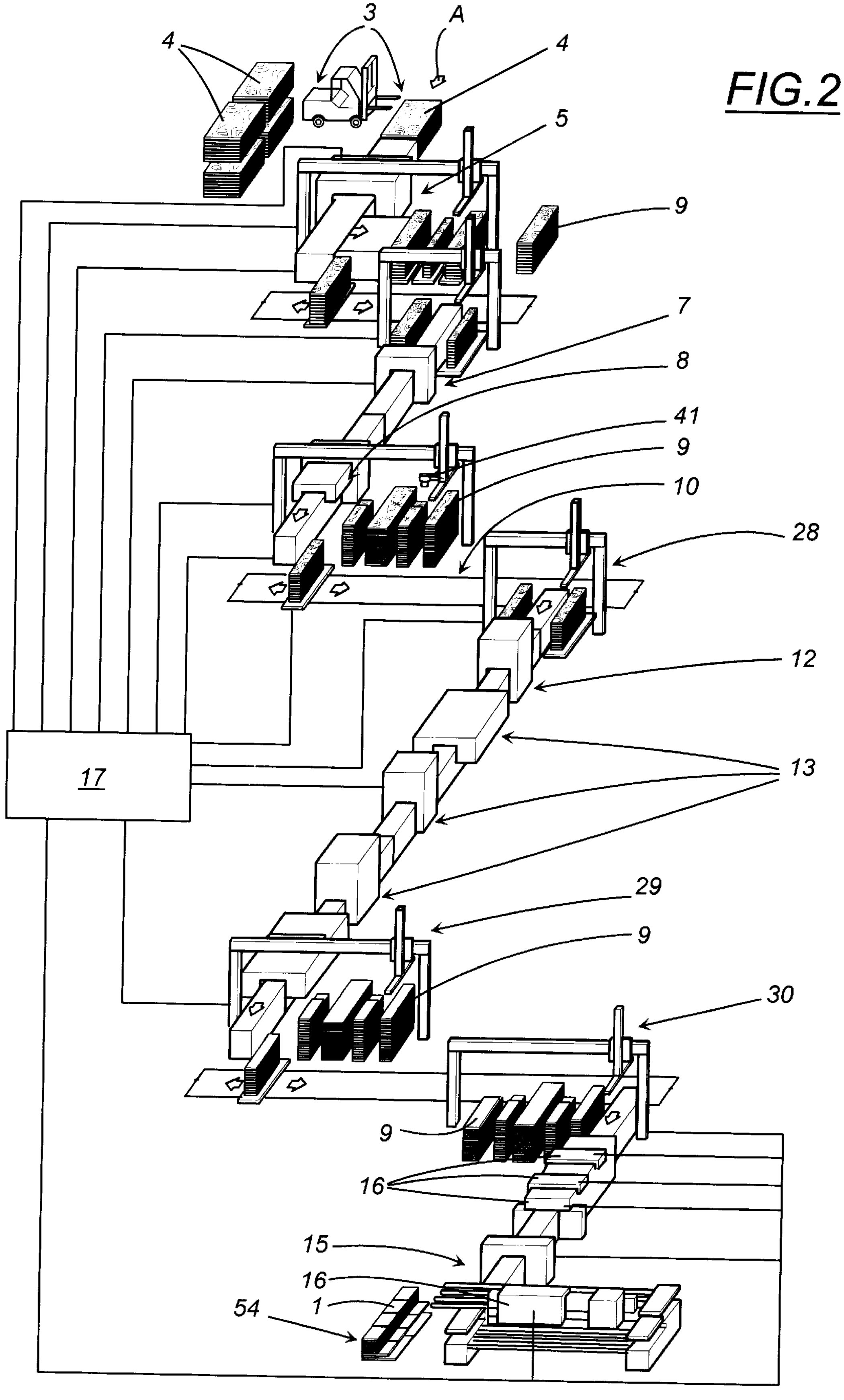
FIG. 2 is a schematic perspective layout view, with some parts cut away in order to better illustrate others, of the system for making wooden furniture panels disclosed by the present invention.
Figure 7:
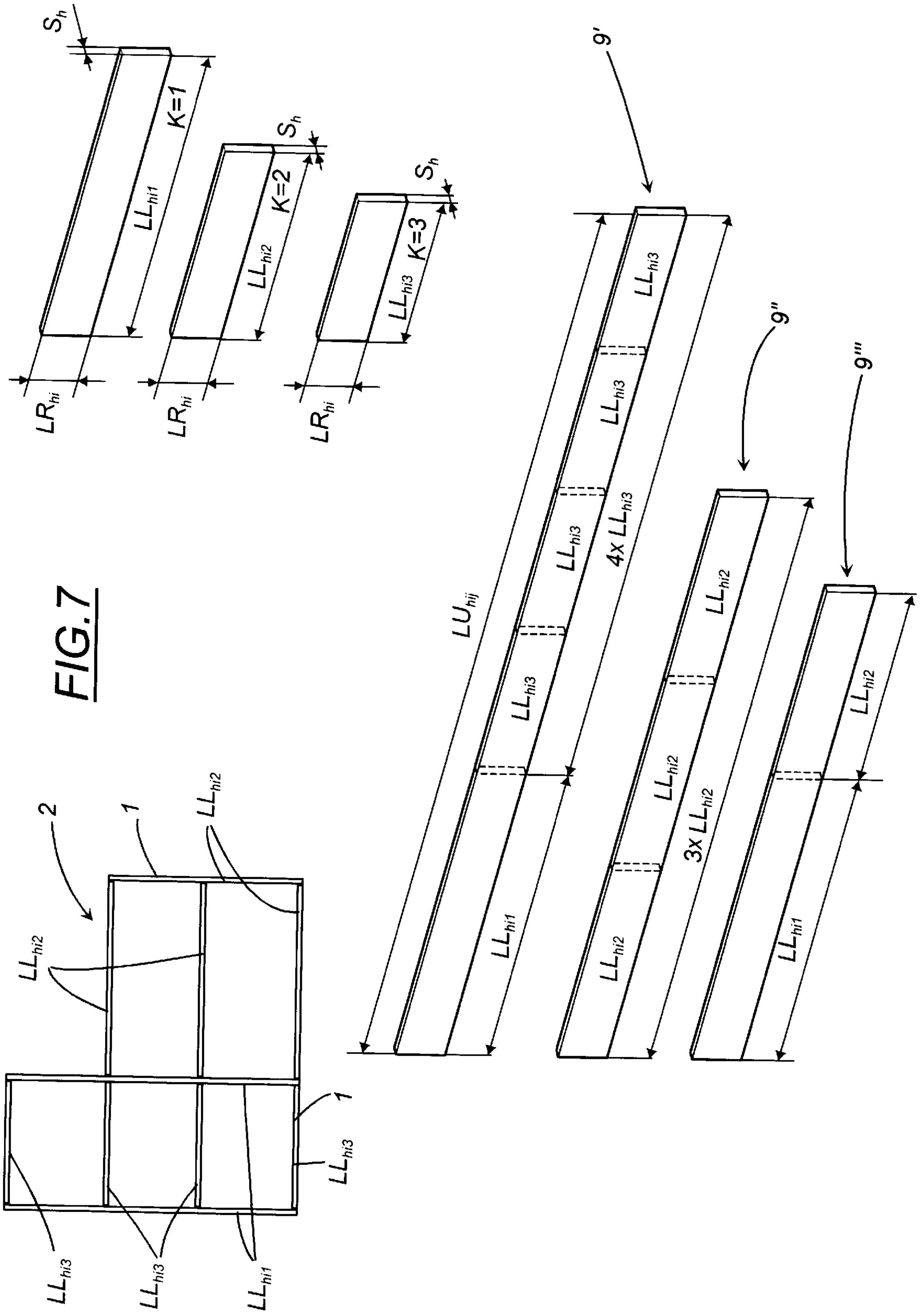
FIG. 7 is a design drawing showing, in schematic front and perspective views, a furniture unit and the different panel strips made by the system disclosed by the present invention and used to make up the furniture unit.

In accordance with the accompanying drawings, and in particular FIGS. 1 and 2, the system disclosed by the present invention is used to make panels 1 in wood or similar material to define single prismatic elements of variable thickness $S_h$ (where "h" is an integer indicating different values of thickness according to working requirements, as can also be seen in FIG. 7) which can be assembled to form furniture units 2.

The system (as shown in particular in FIG. 2) comprises a plurality of stations which, in the embodiment illustrated, are located along a feed line indicated by the arrow A in all the illustrations. The line A does not necessarily indicate a continuous system but only a sequence of operations necessary to make the panels 1.

The description given here refers, purely by way of example, to a continuous system in order to better describe the concept whereby the panels 1 are made. The panels 1 can also be made in separate stations, independent of each other, which are not located one after the other and which may even be in different rooms.

The first station 3 is used for loading an unworked piece 4 of defined thickness $S_h$ onto a second station 5 for cutting the unworked piece 4 lengthways into two or more strip elements 6 whose width is defined by the size of the panels required downstream of the system and is labelled $LR_{hi}$ in FIGS. 1 and 7 (where "i" is an integer indicating different values of thickness which may differ from one loaded piece to the next).

The strip elements 6 are then grouped together by width $LR_{hi}$, that is to say, in groups of the same width.

Figure 3:
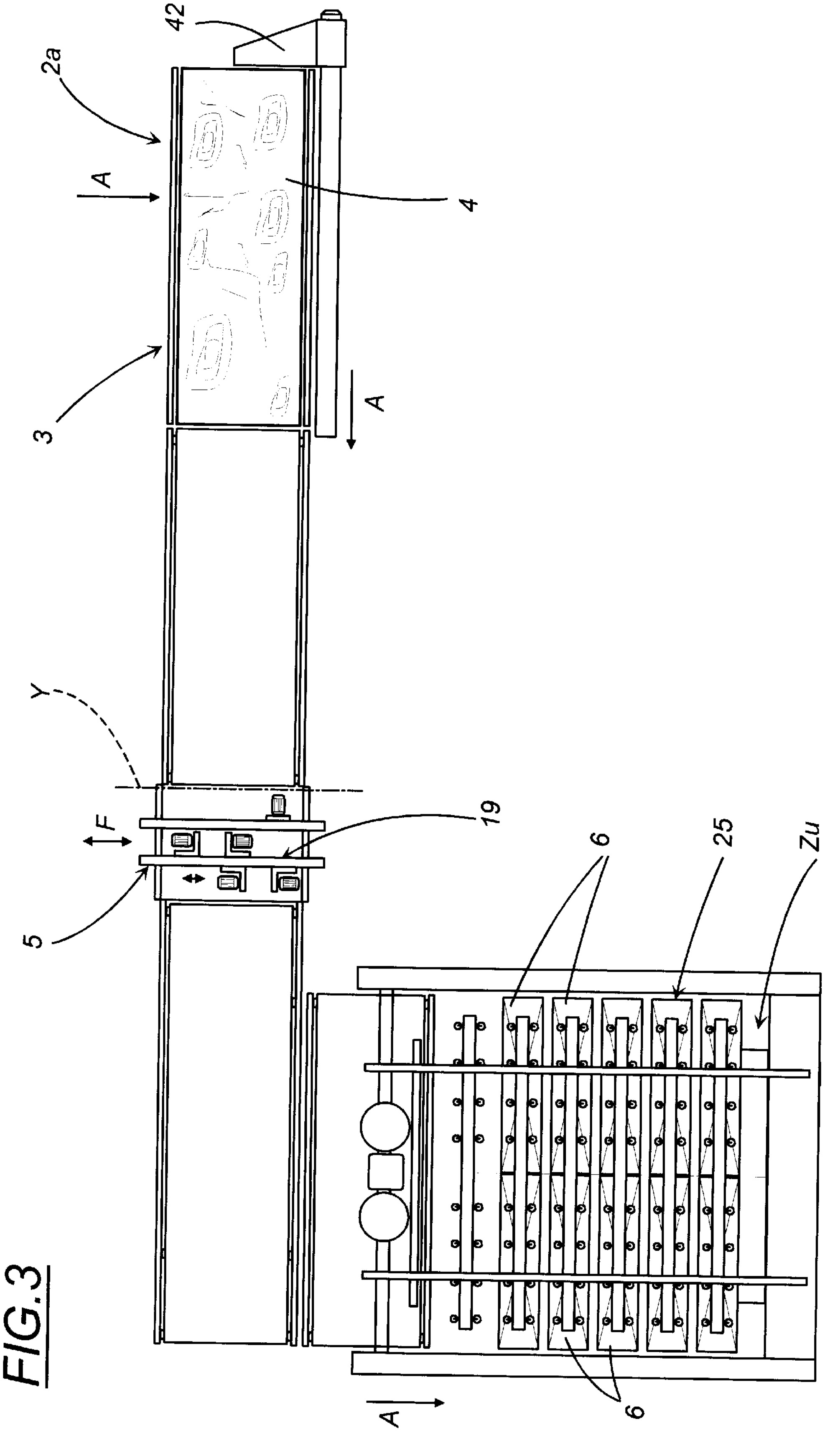
FIG. 3 is a top plan view, with some parts cut away in order to better illustrate others, of a part of the system illustrated in FIG. 2, namely, a station for loading and sawing unworked panels.

As can be seen better in FIG. 3, the second station 5 envisages an element 42 that pushes the unworked pieces 4 towards the cutting means 19, which are adjustable along an axis Y transverse to the aforesaid feed line A (see arrows F in FIG. 3) so as to obtain a presettable size change of the width LR of the strip elements 6 when the next unworked piece 4 arrives.

Figure 4:
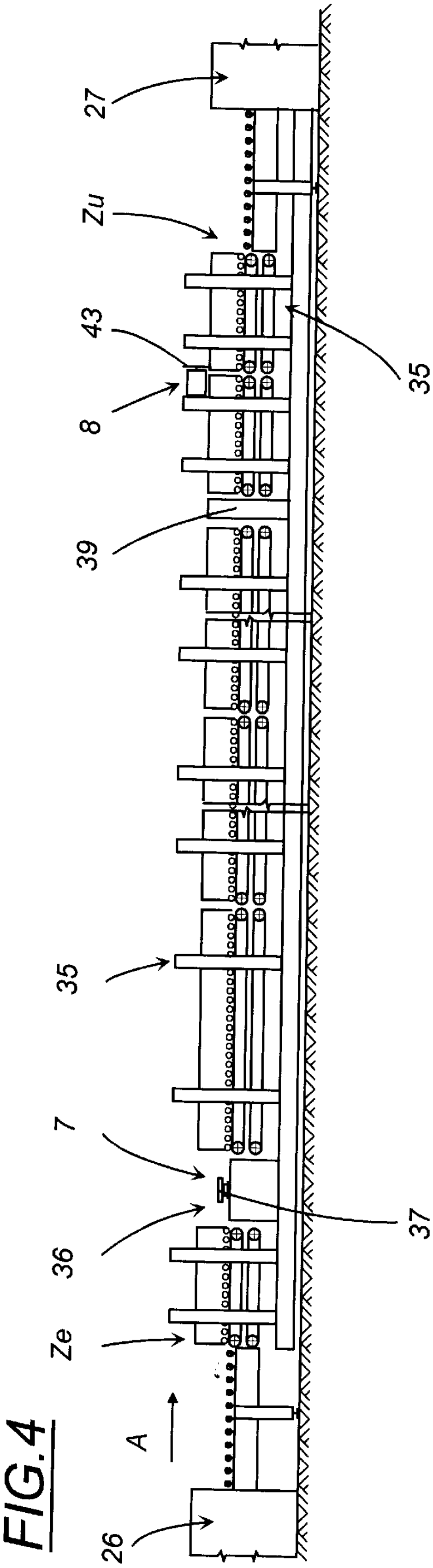
FIG. 4 is a schematic side view, with some parts cut away in order to better illustrate others, of another part of the system illustrated in FIG. 2, namely a station for end cutting and gluing and crossways cutting of the strip elements.
Figure 5:
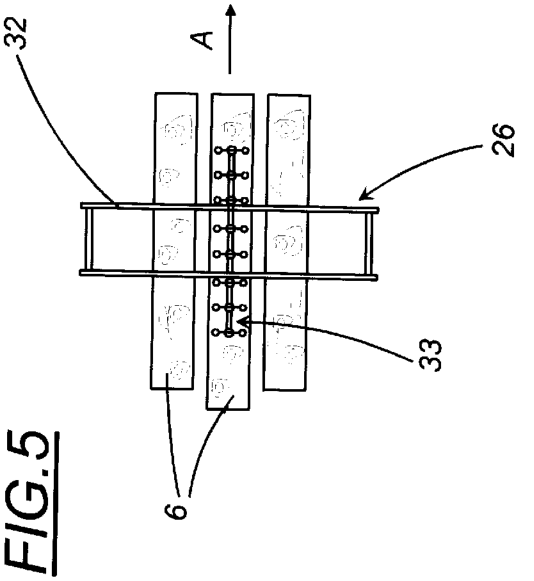
FIGS. 5 and 6 are schematic top plan views of pickup and release units of strip elements and panel strips, respectively, as they feed into and out of the station illustrated in FIG. 4, respectively.

The strip elements 6 feeding out of the second station 5 are fed into a third station 7 which machines the leading end 6*a* and the trailing end 6*b* of each strip element 6 as it moves forward (see FIG. 4).

Machining of the leading and trailing ends 6*a* and 6*b* can be effected by means 36 consisting of a pair of cutting tools 37 designed to prepare the surfaces of the leading and trailing ends of each strip element 6, these surfaces lying in a vertical plane relative to the feed line A.

The machining of the leading and trailing ends 6*a* and 6*b* of each strip element 6 then permits adhesive to be applied to the leading and trailing end surfaces 6*a* and 6*b* (see FIG. 4 again). The gluing operation is effected by means 39 positioned downstream of the cutting tools 37 and results in the strip elements 6 being joined together end to end to form a continuous strip N of strip elements 6 of equal width $LR_{hi}$ and equal thickness $S_h$.

Still looking at FIG. 4, it can be seen that the continuous strip N continues moving forward until it reaches a fourth station 8 where it is cut crossways into a plurality of unworked "optimized panel strips" 9 whose length $LU_{hij}$ (where $LU_{hij}$ may have different values of length depending on the use to which the panel strip 9 will be put and where "j" is an integer indicating different values of length) is variable and such as to define a sum of the multiples of the lengths $LL_{hik}$ (where $LL_{hik}$ has different values as a function of the panel or panels 1 that will define the panel strip 9 and "k" is an integer indicating different values of length) of the panels 1 needed to make the units 2 required or programmed downstream of the system.

The continuous strip N is cut into two or more panel strips 9 by a saw 43 that moves along an axis transverse to the feed line A.

The term "optimized panel strip" 9 refers to the fact that the strip is made with an optimal "j-th" length derived from a single panel 1 or from a sum of panels 1 making up the furniture unit 2 and set beforehand downstream of the system, in addition to the set of machine operations which the panel strip 9 will undergo at the subsequent system stations.

In other terms (see FIGS. 1 and 7 again), once the value "h" defining the thickness and the value "i" of the unworked piece 4 have been set, the strip elements 6 are joined to form a single continuous strip N and then separated into said panel strips 9 made up in different "linear combinations" or, as mentioned above, by sums of the multiples of the panels 1 that will be used to make the furniture unit 2.

In the embodiment of the system described here, these panel strips may be stored in a storage station 10 (illustrated in FIG. 2), said station 10 being designed to temporarily store the panel strips 9 divided, for example, by width LR.

Besides storing the panel strips 9, the station 10 is also used to apply identification means 11 to them so that each time the correct panel strip 9 is fed to the subsequent stations.

The identification means 11 may consist, for example, of a label 40 (see FIG. 1) applicable to each panel strip 9 to enable the panel strip to be identified by optical or magnetic scanning, for example, a bar code applied immediately after the panel strip 9 feeds out of the fourth station 8.

Figure 6:
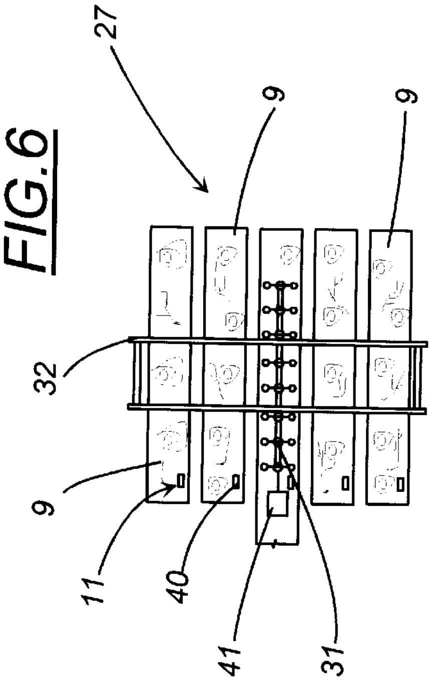

The label 40 is basically an identification code for the panel strip 9 and contains the data describing the dimensions and use of each panel strip 9. The label 40 may be read by an appropriate device 41 (illustrated schematically in FIGS. 2 and 6) fitted to a unit 31 for loading and unloading the panel strip 9 at the next station. This feature facilitates the rational organization of the sequence of pickup operations of panel strips 9 to be fed to a fifth and a sixth station 12 and 15.

The two stations 12 and 15 have a first and second plurality of working areas 13 and 16, illustrated schematically as a series of blocks since they do not strictly form part of the invention.

At these working areas 13 and 16, a series of machine operations are performed on the panel strips 9 according to different priorities. For example, first the surface of the panel strip 9 may be machined and then the large surfaces of each panel strip (see FIG. 1) may be covered with a continuous sheet of material 14 or coated with a liquid, solid or spray-on material, in a preset colour, according to end use.

The last processes to be carried out are those for finishing the end edges 9*a* and 9*b* and the longitudinal edges 9*c* and 9*d* of the panel strip 9 so as to give it the required style (see feed line A' in FIG. 1).

The working areas 13 and 16, like the ones of the previous stations, illustrated in FIG. 4, consist of modular units, which may even be interchangeable, positioned along the feed line A.

As mentioned above, the panel strips 9 which are defined by sums of multiples of the panels 1 to be made, such as the five illustrated purely by way of example in FIG. 1, are defined and prepared along a second direction, labelled A", where the original panel strip 9 may be cut by appropriate crossways cutting means 18 (illustrated only schematically in FIG. 1) located, for example, in said plurality of working areas 16 in the sixth station 15.

The panels resulting from the original panel strip 9 must then be machined further to arrive at the required style. These further machining operations are carried out at other stations along the line forming part of the system disclosed but not illustrated because they do not strictly form part of the invention.

All the modular and operating units located at this station act on each resulting panel in such a way as to make the panel into the required style set downstream of the machine, that is to say, to define the panel 1 proper.

All the panels 1 thus defined can then be placed in a store 54 to be packed and shipped when the furniture unit 2 is complete.

Said stations 3, 5, 7, 8, 12 and 15 and the operating units they are equipped with are all controlled and monitored by means 17 for controlling the sequence of operations required to make the panel strips 9, feed each single panel strip 9 to the working areas 13 and 16 and synchronize the corresponding machine operations in such a way as to define the required styles of the panel strips 9.

The means 17 are illustrated schematically in FIG. 2 as a block since they may comprise microprocessor units connected to optical, computerized, electronic and mechanical sub-units that control the various different stations and the related operating units.

To obtain a process of this kind, it is possible to create a system where, again purely by way of example, the stations have some elements in common. The infeed and outfeed ends, labelled Ze and Zu, respectively, of each of the six stations 3, 5, 7, 8, 12 and 15, for example, envisages a unit for picking up and releasing single strip elements 6 or panel strips 9 one by one. Each of these units, labelled 25, 26, 27, 28, 29 and 30, located along the feed line A, consists of a gantry structure 32 on which means 33 for picking up and releasing the strip element 6 or the panel strip 9 is slidably mounted.

The pickup and release unit 31 located at the storage station 10 differs slightly in that, as mentioned above, its pickup and release unit 33 is equipped with the reading device 42 forming part of the aforementioned means 11 for identifying the panel strips 9 made.

Thus, each pickup and release unit 25, 26, 27, 28, 29, 30 and 31 loads and unloads the strip elements 6 or the single panel strip 9 in the proximity of the previous station and the next station, respectively so as to feed each strip element 6 or panel strip 9 correctly into or out of the corresponding station.

Returning to the concept of panel strip 9 and looking at FIG. 7 again, where the concept is reversed compared to the steps illustrated in FIG. 1, that is to say, we start from how we want the finished unit 2 to be and work backwards to decide how the system can define and combine the panel strips in the most uniform and rational manner.

FIG. 7 shows a unit 2 that could be formed from several panels 1 with the same defined thickness $S_h$ and the same defined width $LR_{hi}$ (that is, with the h-th and i-th values of the panels 1 already set) but with different lengths $LL_{hik}$: FIG. 7, purely by way of example, shows that the furniture unit 2 required is formed from two panels $LL_{hi1}$ with value "k"=1, four panels $LL_{hi2}$ with value "k"=2 and four panels $LL_{hi3}$ with value "k"=3 (obviously, the value "k" indicates a length of the panels 1).

To create this unit 2, we can decide to define three panel strips 9 made up (in one of the many possible combinations) as follows: the first 9' of the sum of one panel $LL_{hi1}$ and four panels $LL_{hi3}$ (whose linear sum thus defines the j-th value of the panel strip 9' made), the second panel strip 9", of the sum of three panels $LL_{hi2}$ and the third panel strip 9'", of the sum of one panel $LL_{hi1}$ and one panel $LL_{hi2}$.

These three panel strips 9', 9" and 9'" therefore differ since the length of each is a different combination of linear sums (or sums of multiples) of the different panels 1 that form the furniture unit 2. Obviously, in some cases, the panel strip 9 may form a single finished panel 1 (that is to say, the j-th length of the panel strip 9 coincides with the k-th value of the single finished panel 1).

A system made in this way provides a high output of wooden panels to make furniture units. This high output is extremely flexible to meet the demands of the market and can optimize not only the stages of cutting the unworked pieces but also the actual time worked by the operating units of the system.

This is achieved by a system whereby optimized panel strips are made from a continuous strip of single elements so that the exact number of panels required at any one time can be made.

The solution:

optimizes the use of the operating units;

minimizes waste by reducing offcuts of unworked material;

increases productivity and thus reduces the lead times of the furniture units;

lowers overall production costs and brings costs of furniture units customized in design and colour into line with the costs of standard production.

The invention described can be subject to modifications and variations without thereby departing from the scope of the inventive concept. Moreover, all the details of the invention may be substituted by technically equivalent elements.

What is claimed:

1. A system for making panels of wood for defining single prismatic elements with variable thickness ($S_h$) where (h=1, 2, . . . , q) designed to be assembled to form furniture units, said system comprising:

a first station for loading an unworked piece having said thickness ($S_h$) defined by the panels needed to make the units required or programmed downstream of the system;

a second station for cutting the unworked piece lengthways into two or more strip elements whose width ($LR_{hi}$) where (i=1, 2, . . . , n) is defined by the panels needed to make the units required or programmed downstream of the system, the second station including means for grouping said strip elements together in groups of the same width ($LR_{hi}$) and thickness ($S_h$);

a third station for machining the leading end and the trailing end of each strip element to then permit the leading and trailing ends to be glued together to form a continuous strip of strip elements;

a fourth station including means for calculating a length ($Lu_{hij}$) where (j=1, 2, . . . , m) defined by at least one sum of multiples of lengths ($Ll_{hik}$) where (k=1, 2, . . . , p) of said panels needed to make the units required or programmed downstream of the system; and, means for cutting said continuous strip crossways into a plurality of unworked optimized panel strips of length ($LU_{hij}$).

2. The system according to claim 1 further comprising:

fifth and sixth stations equipped with a plurality of working areas where at least one machining operation is performed on the unworked panel strip and wherein at least one surface of the panel strip is covered with at least one of a continuous sheet of material, a liquid coating, a solid, and a spray-on material in a preset colour.

3. The system according to claim 1 further comprising:

control means for said stations to control the sequence of operations required to make the panel strips, feed each single panel strip to the working areas and synchronize the corresponding machine operations in such a way as to define the configurations of the finished panel strips.

4. The system according to claim 2 wherein the working areas of the sixth station include means for working the panel strip in such a way as to define two or more panels each having a length ($LL_{hik}$) and a configuration such as can define a part of a furniture unit required.

5. The system according to claim 1 wherein the second, longitudinal cutting station comprises cutting means that can be adjusted along an axis transverse to the cutting direction of the unworked piece so as to obtain a presettable size change of the widths ($LR_{hi}$) of the strip elements each time an unworked piece arrives.

6. The system according to claim 1 wherein the panel strips have on them identification means consisting of a label applicable to each panel strip as it feeds out of the fourth station and designed to enable the panel strip to be identified by optical or magnetic scanning.

7. A method for making panels of wood for defining single prismatic elements with variable thickness ($S_h$) where (h=1, 2, . . . , q) designed to be assembled to form furniture units comprising the following steps:

selecting at least one unworked piece having said thickness ($S_h$) defined by the panels needed to make the units required or programmed downstream of the system;

cutting the unworked piece lengthways into two or more strip elements whose width ($LR_{hi}$) where (i=1, 2, . . . , n) is defined by the panels needed to make the units required or programmed downstream of the system;

grouping said strip elements together in groups of the same width ($LR_{hi}$) and thickness ($S_h$);

machining the leading end and the trailing end of each strip element to then permit the leading and trailing ends to be glued together to form a continuous strip of strip elements;

calculating a length ($Lu_{hij}$) where (j=1, 2, . . . , m) defined by at least one sum of multiples of lengths ($LL_{hik}$) of said panels needed to make the units required or programmed downstream of the system; and cutting said continuous strip crossways into a plurality of unworked optimized panel strips of length ($LU_{hij}$).

8. The system according to claim 2 further comprising:

control means for said stations to control the sequence of operations required to make the panel strips, feed each single panel strip to the working areas and synchronize the corresponding machine operations in such a way as to define the configurations of the finished panel strips.

* * * * *